June 21, 1932. E. R. POWELL 1,864,317
CONTINUOUS PREDETERMINED CHARACTERISTIC STRIP APPARATUS
Filed Aug. 17, 1928 2 Sheets-Sheet 1
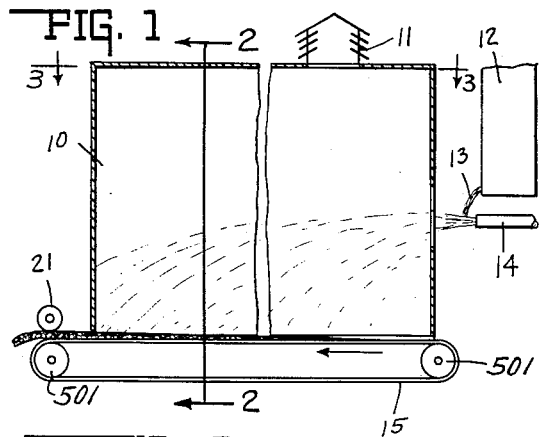
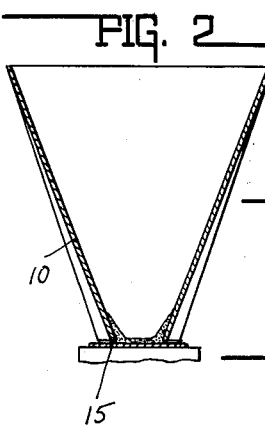
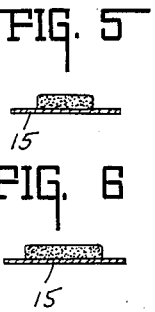
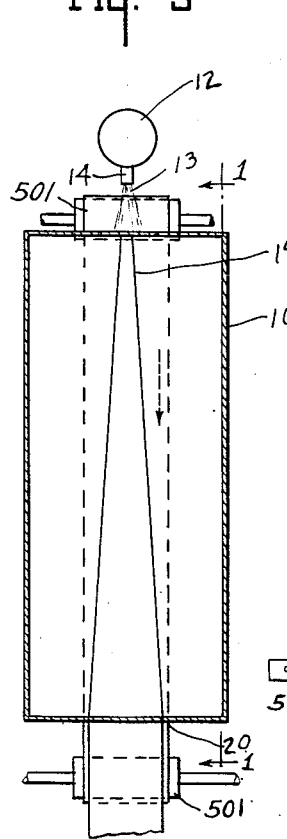
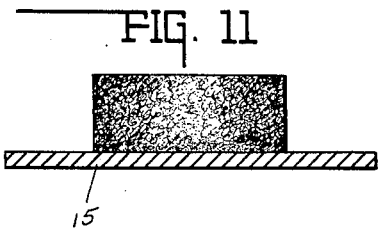
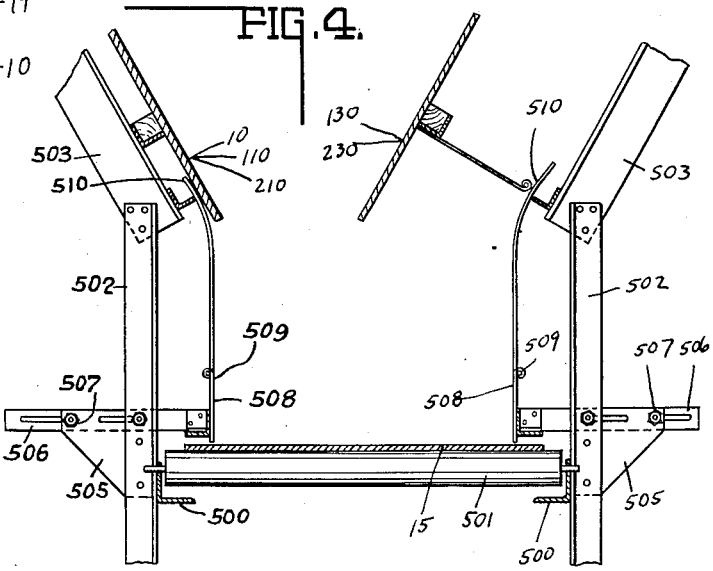
INVENTOR.
EDWARD R. POWELL
BY
ATTORNEYS.

June 21, 1932. E. R. POWELL 1,864,317
CONTINUOUS PREDETERMINED CHARACTERISTIC STRIP APPARATUS
Filed Aug. 17, 1928 2 Sheets-Sheet 2
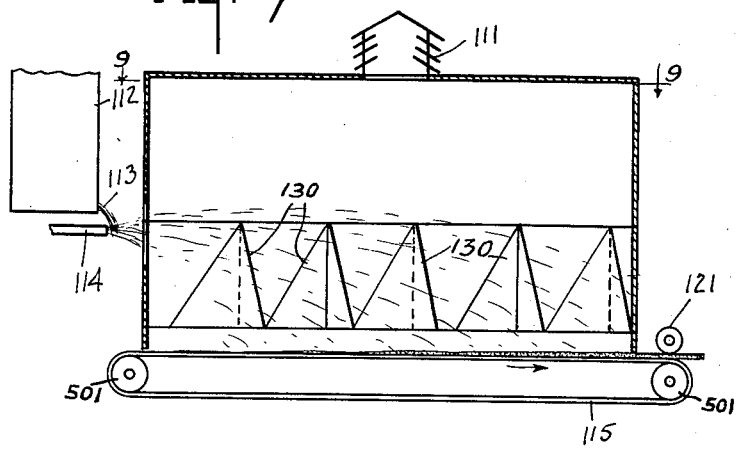
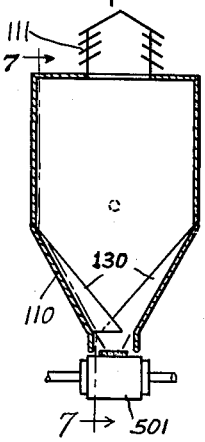
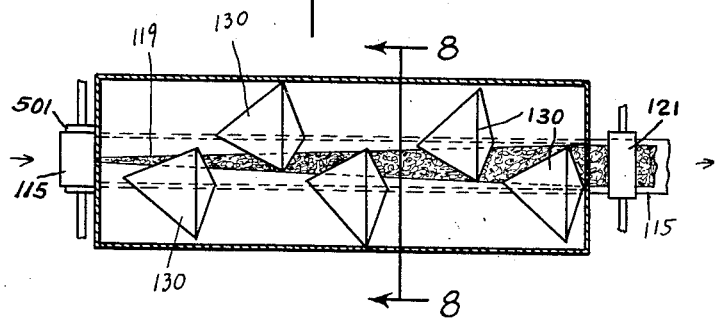
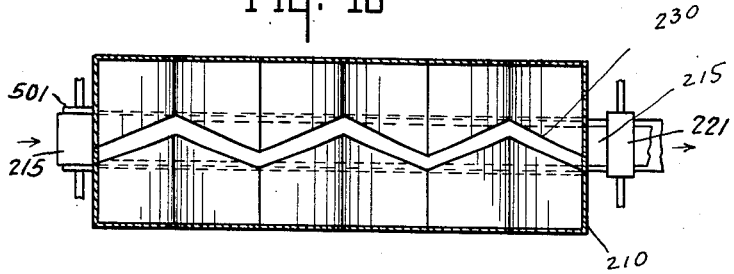
INVENTOR.
EDWARD R. POWELL.
BY
ATTORNEYS.

Patented June 21, 1932

1,864,317

UNITED STATES PATENT OFFICE

EDWARD R. POWELL, OF ALEXANDRIA, INDIANA, ASSIGNOR TO BANNER ROCK CORPORATION, OF ALEXANDRIA, INDIANA, A CORPORATION OF DELAWARE

CONTINUOUS PREDETERMINED CHARACTERISTIC STRIP APPARATUS

Application filed August 17, 1928. Serial No. 300,362.

This invention relates to a blow chamber apparatus utilized in the manufacture of mineral fiber products commonly known as mineral wool, rock wool or glass wool.

The chief object of the invention is to so fashion or construct the delivery surfaces of a blow chamber utilized in the aforesaid industry so that it will discharge upon a conveyor mineral wool in the form of a blanket or felt of a substantially uniform depth and of a predetermined character and width.

One feature of the invention consists in the formation of a gradually tapering opening or exposed portion of conveyor used therewith, the width of the mouth increasing in the direction of the conveyor travel.

Another feature of the invention consists in arranging the discharge throat and opening with angularly arranged sides for angular discharge of the material from the chamber to the conveyor therebeneath.

Another feature of the invention consists in the formation of a chamber with collection and discharge surfaces embodying no obstructions whereby rolling of the fiber obtains and overhanging of the fiber is prevented.

Another feature of the invention consists in the provision of means for secure uniform distribution of the fiber upon the conveyor independent of the variation in the direction of the blast of the fiber in the blow chamber.

The full nature of the invention will be understood from the accompanying drawings and the following description and claims:

In the drawings Fig. 1 is a sectional elevation (taken on line 1—1 of Fig. 3) of a mineral fiber apparatus illustrating diagrammatically the furnace blower, blow chamber and conveyor associated therewith. Fig. 2 is a transverse sectional view taken on line 2—2 of Fig. 1 and in the direction of the arrows. Fig. 3 is a sectional plan view of the invention taken on line 3—3 of Fig. 1. Fig. 4 is an enlarged transverse sectional view of the lower end of each blow chamber showing certain details of construction not depicted in the several diagrammatic drawings. Fig. 5 and Fig. 6 are similar views illustrating the present product invention at two successive stages respectively. Fig. 7 is a sectional elevation taken on line 7—7 of Fig. 8 showing a modified form of the apparatus. Fig. 8 is a transverse sectional view taken on line 8—8 of Fig. 9 and in the direction of the arrows. Fig. 9 is a sectional plan view of the blow chamber taken on line 9—9 shown in Fig. 7. Fig. 10 is a view similar to Fig. 9, but of still another embodiment of the invention. Fig. 11 is an enlarged transverse sectional view of the product invention showing some of its internal physical variations.

Referring to Figs. 1-3 inclusive, which illustrate the preferred embodiment of the invention, the settling chamber is an elongated structure as indicated in Fig. 3 having a conveyor 15 disposed therebeneath. Conventional means are provided for forming a blast of mineral fibers at one end of the chamber including a furnace or cupola 12 for melting the mineral material and a nozzle 14 by means of which a steam jet or the like is impinged upon the molten stream of mineral material 13 which is drawn off at the bottom of the cupola thereby disintegrating the stream and blowing the resultant fibers into the settling chamber in the usual manner. A suitable vent 11 is provided in the upper part of the chamber for the escape of air and steam introduced into the chamber together with the blast of mineral fiber.

In accordance with this invention the settling chamber is provided with oppositely disposed side walls 10 which are inclined inwardly from the vertical as shown in Fig. 2 and also diverge laterally as is best shown in Fig. 3 so as to form a fiber discharge outlet or opening over the conveyor of gradually increasing width. The inwardly inclined side walls 10 constitute a throat-like construction and act as a collecting surface for a large amount of the fiber and as indicated in Fig. 2 the fiber thus collected is delivered in a concentrated mass to the transverse portion of the conveyor in the immediate vicinity of the lower edges of the side walls. Due to the gradually increasing width or divergency of the fiber discharge outlet transversely to the direction of conveyor travel this concentrated deposition of fibers occurs upon successive transverse portions of the conveyor during its travel until the conveyor is covered for its full width by a felt of substantially uniform thickness and width. Figs. 5 and 6 illustrate the character of the felt formed at two different stages of the travel of the conveyor.

By this construction the width of the fiber stream can be regulated by the width of the orifice or opening at the end of the belt travel and uniform thickness of the stream obtains. The resultant construction automatically and uniformly spreads a material such as mineral wool or mineral fiber.

It is characteristic of a blow chamber of the class shown that the wool which falls on the belt while near the furnace end of the chamber is of finer texture or varying texture from that which falls while near the center or the discharge end. Inasmuch as the smaller particles have a greater ratio of surface area to weight than have the larger particles, these smaller particles offer more air resistance and hence are not carried as far forward toward the discharge end as the larger particles. The various arrangements shown dispose of the varying texture material in various ways. The arrangement of Figs. 1, 2 and 3 disposes the fine texture material generally toward the center, see Fig. 11 while arrangement of the discharge in Fig. 10 also disposes the fine texture material towards the bottom (also see Fig. 11) inasmuch as the smaller particles are the first to fall to the travelling belt; the larger particles first striking the inclined faces 230 before falling and being deflected to said belt.

A modified form of the invention is illustrated in Figs. 7 to 9 inclusive. In this form the conveyor includes the inclined sides 110 with the opening 119 gradually tapering in increasing width in the direction of belt travel, the belt being indicated by the numeral 115. Felting or other rollers as indicated by the single roller 121 may be employed if desired. Roller 121 is shown so as to indicate that certain operations may be performed on the strip as it leaves the belt, if found desirable. The furnace 112 through the steam jet 114 discharges the molten spray 113 as blown wool or fiber into the blow chamber and the fiber falls therethrough, the steam and air venting through the ventilator 111. The inclined sides discharge through the gradually tapering opening 119 onto the belt as aforesaid. The laterally displacing guides 130 positioned in the hopper-like bottom of the blow chamber laterally discharge the collected fiber onto the belt through the orifice of the blow chamber. As shown in Fig. 9 these lateral deflectors form lateral edges positioned above the belt and cause lateral discharge of fiber across the width of the belt as the belt progresses. These lateral deflectors are positioned in superposed relation to the belt and clear the same to the desired depth of the stream to be deposited upon the belt.

As shown in Fig. 4 guide walls which are adjustably mounted may be added for assuring predetermined width of strip collection. Herein 500 indicates the frame for the belt 501 the roller supporting the same, 502 standards supporting the hopper supporting members 503 which support the sides 10 (Figs. 1, 2, 3), 110 (Figs. 7, 8, 9) or 210 (Fig. 10) having inclined surfaces 130 (Figs. 7, 8, 9) or 230 (Fig. 10). Adjustably supported on standards 502 by plates 505 members 506 at 507 are the guide plates 508 having a hinged joint 509 and sliding joint 510 with the hopper bottom or mouth. It is to be understood that this Fig. 12 shows the detailed construction of the lower portion of the blow chamber this detailed construction being the same for the different embodiments of the invention.

A further embodiment of the invention is shown in Fig. 10 and in this form the belt 215 passes beneath the blow chamber 210, the orifice of which terminates in inclined faces 230 which from end to end have a zigzag or laterally directed edge. With this configuration of the fiber discharge outlet substantially the same result obtains as with the lateral deflectors 130, that is lateral dispersion across the width of the belt, the side edge of the stream upon the belt being coincident with the extreme lateral deflection of the zigzag mouth. In this form of the invention the gradually increasing mouth may be omitted, but it may be utilized if desired.

In each of the embodiments of the invention disclosed herein, it will be noted that there are no acute edges in the surfaces upon which the material discharges or settles. The purpose of this arrangement is to prevent the material as it settles from wrapping around obstructions and overhanging. With this construction, each surface is self-cleaning and there is no accumulation of fiber on the lee side of the elevations, reference being had to the direction of the discharge of the material.

The invention claimed is:

1. Apparatus for forming a strip of felted mineral fiber comprising a fiber settling chamber having oppositely disposed side walls and an outlet adjacent its lower end, a movable surface therebeneath for receiving said fiber and means associated with said outlet for successively depositing fiber upon said surface in laterally sinuous relationship, said means comprising deflectors formed on said side walls in staggered relationship.

2. In apparatus of the class described, a blow chamber provided with delivery surfaces comprising oppositely placed, inwardly inclined side walls in spaced relation forming a throat, said throat having an outlet at the bottom thereof, a moving conveyer therebeneath, said outlet diverging in the direction of conveyer travel.

3. In apparatus of the class described, a blow chamber provided with delivery surfaces comprising oppositely placed, inwardly inclined walls forming a throat, said throat having an outlet at the bottom thereof, a conveyor in spaced relationship therebeneath, said outlet diverging in the direction of conveyor travel and deflectors on said side walls, said deflectors extending to said outlet and having upwardly converging shapes, the bases of which extend crosswise of the outlet.

4. In apparatus of the class described, a blow chamber provided with delivery surfaces comprising oppositely placed inwardly inclined side walls forming a throat, said throat having an outlet at the bottom thereof, a conveyor therebeneath, said outlet diverging in the direction of the conveyor travel, said side walls having deflectors formed thereon and extending to said outlet and having upwardly converging shapes, said deflectors causing a more even discharge of fibre across the width of the conveyor as said conveyor progresses below said outlet.

5. In apparatus of the class described, a blow chamber adapted to receive a blast of mineral fibre at one end, said chamber being provided with delivery surfaces comprising oppositely placed, inwardly inclined side walls forming a throat, said throat having an outlet at the bottom thereof and a movable conveyor therebeneath, said movable conveyor moving substantially parallel with and away from said blast, said outlet diverging in the direction of conveyor travel.

6. In apparatus of the class described, a blow chamber adapted to receive a blast of mineral fibre at one end, said chamber being provided with delivery surfaces comprising oppositely placed, inwardly inclined side walls forming a throat-like construction, said throat-like construction terminating in a fiber-discharge outlet at the bottom thereof and a movable conveyor therebeneath, said movable conveyor moving substantially in line with said blast, said outlet being divergent in a direction transverse to the direction of conveyor travel, whereby said fibre is deposited in the form of a bat on said conveyor of uniform depth and width.

7. In apparatus of the class described, a blow chamber adapted to receive a blast of mineral fibre at one end, said chamber being provided with delivery surfaces comprising oppositely placed, inwardly inclined side walls forming a throat, said throat having an outlet at the bottom thereof, a movable conveyor therebeneath, said movable conveyor moving parallel to and away from said blast, said outlet diverging in the direction of conveyor travel and deflectors on said side walls in staggered relationship to each other, whereby a lateral discharge of fibre of uniform depth across the width of the belt of the conveyor is caused as the conveyor progresses below said outlet.

8. In apparatus for blowing mineral wool, a blow chamber, a moving conveyor therebeneath, delivery surfaces sloping toward one another and toward said conveyor, said surfaces diverging in the direction of conveyor movement and deflectors associated with the delivery surfaces adapted to effect a substantially even distribution of blown wool crosswise of the conveyor.

9. In apparatus for blowing mineral wool, a blow chamber, a moving conveyor therebeneath, delivery surfaces extending downwardly toward the conveyor, said surfaces diverging in the direction of conveyor movement and deflectors associated with the delivery surfaces adapted to effect a substantially even distribution of blown wool crosswise of the conveyor.

10. In apparatus of the class described, a blow chamber adapted to receive a blast of mineral fibre at one end, said chamber being provided with fiber collecting and delivery surfaces comprising oppositely disposed side walls inclined inwardly from the vertical and terminating at the bottom thereof in a fiber-discharge outlet, a conveyor disposed beneath said outlet and movable in a direction substantially in line with said blast, said fiber-discharge outlet having a configuration adapted to cause a concentrated deposition of the fibers at successive transverse portions of the conveyor during the course of its travel beneath the outlet whereby said fiber is deposited in the form of a bat of substantially uniform thickness.

In witness whereof, I have hereunto affixed my signature.

EDWARD R. POWELL.